May 20, 1947.　　　W. E. HANNA　　　2,420,776
GRADING AND CUTTING MACHINE FOR PREPARING SEED POTATOES FOR PLANTING
Filed May 18, 1944
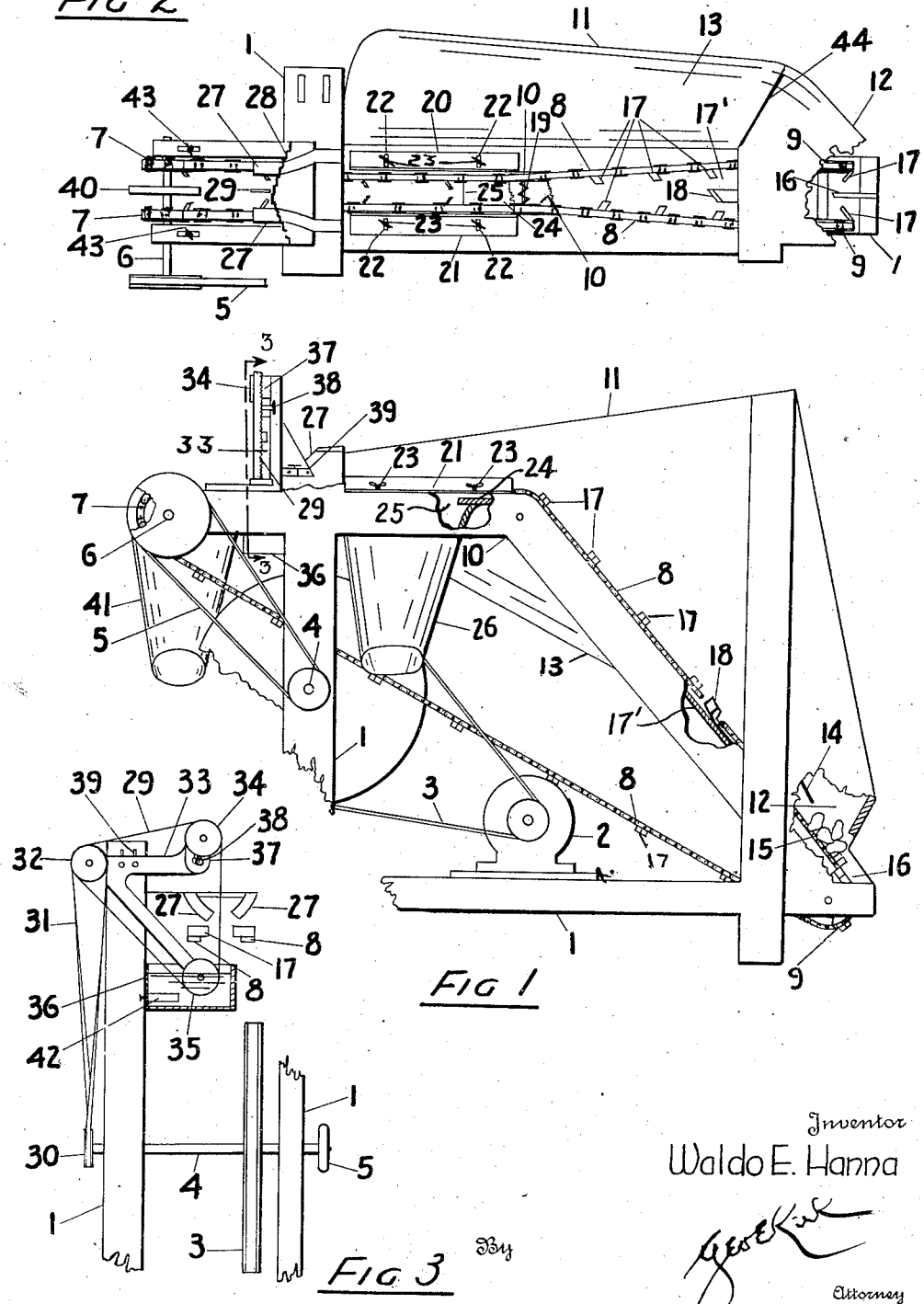
Inventor
Waldo E. Hanna Patented May 20, 1947

2,420,776

UNITED STATES PATENT OFFICE 2,420,776

GRADING AND CUTTING MACHINE FOR PREPARING SEED POTATOES FOR PLANTING

Waldo E. Hanna, Mount Cory, Ohio

Application May 18, 1944, Serial No. 536,107

2 Claims. (Cl. 146—88)

This invention relates to a machine for the cutting of seed potatoes.

One object of the invention is to provide a machine for selecting from a group of run-of-the-crop potatoes those of sufficient size to be suitable for use as seed potatoes and cutting the same to provide sections for planting.

The larger potatoes, which are better adapted for use as seed potatoes, normally depart from the spherical form and are more or less elongated, egg-shaped or ellipsoidal, and the eyes, desired for seed potatoes, are clustered about the end portions. Therefore seeding advantages are derived from cutting the seed potatoes lengthwise, whereby the eyes in the cut sections of the potato are in spaced relation determined by the connecting intermediate body portion of the potato sections. A further object of the invention is the provision of means in the machine for orienting longitudinally seed potatoes and for carrying said potatoes endwise to and past a cutting device which severs the potatoes from end to end and discharges the cut sections.

A further object of the invention is the provision of sterilizing or disinfecting means for the cutter to prevent it from transferring infection or contamination from one potato to succeeding ones during the cutting operation.

Referring to the drawings:

Fig. 1 is a side elevation of the machine embodying the invention, parts being broken away;

Fig. 2 is a plan view of portions of the machine of Fig. 1; and

Fig. 3 is a view from the left of Fig. 1, showing features of the knife or cutter mounting and drive therefor, and taken on section line III—III, Fig. 1.

A frame 1 is shown mounting a motor 2 having speed reduction belt gearing therefrom. A belt 3 from the motor 2 drives a shaft 4. The shaft 4, thru a belt 5, drives a shaft 6. The shaft 6 has fixed thereon a pair of sprocket wheels 7 for driving the conveyor and grader system of this apparatus.

The conveyor is mounted in the frame 1 and includes approximately parallel sprocket chains 8 which extend about respective wheels 7 in a downwardly and rearwardly inclined direction to and about a pair of idler wheels 9, then in an upwardly inclined direction to and about idler wheels 10 and horizontally forward to the wheels 7 to complete their circuits, all as shown in Fig. 1.

Potatoes, to be cut for seeding, may be dumped into a hopper 11 having a skewed lower portion 12 and a continuously inclined bottom 13 of sufficient slant to avoid angle-of-repose lodging of the potatoes therein. A shield or inclined guide portion 14 provides a space therebelow above the belts 8 for potatoes 15 to lodge therebetween. The frame 1 has a tongue portion 16 extending upward between the wheels 9 sufficiently to reduce the clearance between the hopper discharge and the conveyor so that potatoes may not spill therefrom.

Fingers or strap members 17 are fixed to the chains 8, extend toward each other and are deflected rearwardly with their supporting faces inclined rearwardly from their outward edges as shown in Figs. 2 and 3. These strap members constitute cooperating flights on the conveyor chains which flights clear the tongue 16 as they pass along the upwardly inclined reach between the sprockets 9, 10, and through the hopper portion 12. These flights pick up a potato or potatoes from the lower end of the hopper and move it or them upwardly under the shield 14. The tongue 16 is of extent to prevent leakage of the potatoes from the bottom end of the hopper, but allows the spaced flights or straps to pass into the lower end of the hopper. A spring tongue 18 is fixed to a hopper floor strip 17' and extends upwardly between the ends of the flights, at about one half the height of the flight, to kick out and back into the hopper, potatoes in excess of one for each pair of flights. The reaches of the chains 8 converge toward each other as they move from the sprockets 9 to the sprockets 10 to grip the potatoes retained by the flights in their passage through the hopper.

During the travel of the potatoes up the inclined floor 17' between the sprockets 9, 10, and about the sprockets 10, the flights 17 cause a jostling and reshifting of the potatoes, orienting them longitudinally in the general direction of their movement toward the cutter. Between the sprockets 10, 7, the conveyor chains run horizontally.

Compression helical spring 19, between the wheels 10, tends normally to maintain the spaced relation therebetween. Chain guard angles 20, 21, along this horizontal reach portion of the chains 8, have slots 22 with wing nuts 23 to set these guides 20, 21, in a desired adjusted position. This may crowd the bearings for the wheels 10 toward each other against the resistance of the spring 19. The converging end portions of the flights 17 are thereby moved closer together. A floor section 24, spaced from the floor 17', extends along this horizontal reach toward the sprockets 7 to an opening 25 for undersize potatoes to drop clear of the flights and into a hopper 26, for bagging therefrom, or to be combined with the cut potato portions.

The potatoes gripped by the flights 17 at the adjusted spacing of the guard 20, 21, ride along with the chains 8, being carried beyond the opening 25 and are held down by three members. On each side of the downwardly converging strap springs or yieldable leaves 27 extend from above downwardly and into contact with the longitudinal side portions of the potates and prevent them from misalignment as they pass to and through the cutting zone. A further member 28 extends over and in contact with the top portion of the potatoes to additionally control and firmly hold the potato against upward movement as it enters the cutter 29.

The shaft 4 has fixed thereon a V-belt pulley 30 to actuate a belt 31 for driving a wheel 32 in a frame 33 having follower wheels 34, 35, for the endless toothed hand or saw knife 29. The saw 29, as it moves about the follower wheel 35, enters a treating vessel 36, which contains electrically heated water or other treating solution, for sterilizing the used portion of the knife after it leaves the potato.

The follower wheel 34 has an auxiliary bracket 37 with a bolt and slot adjustment connection 38 (Fig. 3) to the frame 33, as a saw band adjuster or tightener. The frame 33 has bolt and slot adjustment connections 39 (Fig. 1) with the frame 1, thereby to determine the position for the knife or cutter 29 in the desired central position, to slice lengthwise, the on-coming potato between the chains 8.

Fixed on the shaft 6, with the wheels 7 and therebetween, is a disk 40 of a diameter at least half the upward extent of the flights 17. This disk 40 is effective, should the sliced potato not of itself fall clear after being cut, to push the potato sections clear of the flights, to be gathered at a hopper 41 into a receiver with the accumulations in the hopper 26, or to be separately bagged for transfer to the potato seeder.

The speed of operation may be upward of one foot per second. The flight pairs 17 may be located in such proximity to permit ready pick-up and with sufficient inter-flight clearance for the potato as selected to freely roll into the natural lengthwise position therefor.

With the belt 31 removed, the saw band 29 operates as a fixed blade or knife. The adjustment of the wheel 34 upward, is normally for determining the tension or tightness for the blade 29. The adjustment connections 39 crosswise slots, permit transverse as well as forward and back adjustments. Advantage from these arises in determining the cutter position as to the yieldably-acting hold-down fingers 28 in thrusting the potato against the knife or blade 29.

When hot water sterilization treatment is adopted, an electric heater 42 may be installed in the tank or vat 36.

For bringing about the desired taut condition for the belts 8, adjusting means 43 may be adopted for the wheels 7 as to the frame 1.

To effect potato grading adjustment, the angle guards 20, 21, may be adjusted to converge knifewards.

A partial partition 44 allows underflow of potatoes to the minor hopper portion 12 in such quantity as not to clog the take-off therefrom, but to maintain a supply therefor.

What is claimed and it is desired to secure by Letters Patent is:

1. A seed potato grader and slicer comprising a hopper, a conveyor for withdrawing potatoes from the hopper, including a pair of spaced endless sprocket chains, sprocket wheels for supporting said chains, means for driving the sprockets for moving the chains in synchronism, flights fixed on said chains, embodying fingers extending in pairs toward each other and rearwardly relative to the direction of movement of the chains with a space between the free ends thereof, a frame for supporting said endless chains in an opposed obtuse triangular relation, the sprocket pairs being located at the angles with the hopper positioned at the lower acute angle, the distance between the chains adjacent the hopper being substantially greater than that at the upper obtuse angle to provide a narrowing ascent course from the hopper and reduce the clearance between the free ends of the flight fingers beneath the hopper where the chains and flight fingers are spaced apart the greater distance for deflecting the excess potatoes from between the flights back to the hopper, a second conveyor course extending from the sprockets at the obtuse angle to the second acute angle, means for adjusting the clearance between the chains and the free ends of the flight in the second course to grade the potatoes and release for discharge small potatoes not sufficiently grasped by the flights, an endless cutter band blade having a cutting portion extending vertically between the free ends of the flights beyond the grading portion of the second course to cut the potatoes into seed sections as they are fed past the blade, and means to discharge the cut sections after they pass the cutting blade.

2. A seed potato grader and slicer comprising a hopper, a conveyor for withdrawing potatoes from the hopper, including a pair of spaced endless sprocket chains, sprocket wheels supporting said chains, means for driving the wheels for moving the chains in synchronism, flights fixed on said chains embodying fingers extending in pairs toward each other and rearwardly relative to the direction of movement of the chains with a space between the free ends thereof, a frame for supporting said endless chains in providing, from the lower portion of the hopper, an upwardly inclined course extending to deliver to a horizontally extending course, the distance between the chains adjacent the hopper being substantially greater than that at the horizontal course to provide a narrowing ascent course from the hopper and reduce the clearance between the spaced-apart free ends of the flight fingers in coacting to deflect excess potatoes from the flights back to the hopper, in the horizontal course, means for further adjusting the clearance between the spaced-apart free ends of the flights to grade the potatoes and release for discharge small potatoes not sufficiently grasped by the flights, and a cutter past which the horizontal course is effective to carry retained potatoes to be there sliced into seed sections for discharge from the conveyor.

WALDO E. HANNA.

REFERENCES CITED

The following references are of record in the file of this patent:

UNITED STATES PATENTS

| Number | Name | Date |
| --- | --- | --- |
| 857,332 | Cunning | July 18, 1907 |
| 1,961,009 | Nachtigal | May 29, 1934 |
| 1,916,596 | Winfree, Jr. | July 4, 1933 |
| 1,501,941 | Bunting | July 22, 1924 |
| 219,871 | Olin | Sept. 23, 1879 |
| 2,006,091 | Walter | June 25, 1935 |